US007852800B2

(12) United States Patent
Schiff et al.

(10) Patent No.: US 7,852,800 B2
(45) Date of Patent: Dec. 14, 2010

(54) REDUCING INTERFERENCE BETWEEN USERS IN A COMMUNICATIONS SYSTEM THROUGH TIME SCATTERING

(75) Inventors: Leonard N. Schiff, San Diego, CA (US); David S. Miller, Auckland (NZ)

(73) Assignee: Qualcomm Incorporated, San Diego, CA (US)

( * ) Notice: Subject to any disclaimer, the term of this patent is extended or adjusted under 35 U.S.C. 154(b) by 1441 days.

(21) Appl. No.: 10/602,358

(22) Filed: Jun. 23, 2003

(65) Prior Publication Data

US 2004/0052237 A1 Mar. 18, 2004

Related U.S. Application Data

(60) Provisional application No. 60/398,278, filed on Jul. 23, 2002.

(51) Int. Cl.
*H04B 7/212* (2006.01)

(52) U.S. Cl. ....................... 370/321; 370/322; 370/324; 370/252; 370/337; 370/347

(58) Field of Classification Search ......... 370/321–324, 370/252, 336, 337, 347, 401; 455/63, 12.1, 455/13.1, 370, 455
See application file for complete search history.

(56) References Cited

U.S. PATENT DOCUMENTS 3,879,581 A * 4/1975 Schlosser et al. ............ 370/324
4,625,308 A * 11/1986 Kim et al. ................... 370/321

(Continued)

FOREIGN PATENT DOCUMENTS

JP 2000244970 A 9/2000

(Continued)

OTHER PUBLICATIONS

Jingfeng Li et al.: "An improvement of reservation code multiple access for integrated voice/data spread-spectrum system" Vehicular Technology Conference, 1999. VTC—1999—Fall. IEEE VTS 50th Amsterdam, Netherlands Sep. 19-22, 1999, Piscataway, New Jersey, US, IEEE, US Sep. 19, 1999 (pp. 367-370) XP010352908, ISBN: 0-7803-5435-4, p. 368m kubes 3-13, lines 14-31.

(Continued)

*Primary Examiner*—Salman Ahmed
*Assistant Examiner*—Andrew C Lee
(74) *Attorney, Agent, or Firm*—Turocy & Watson, LLP

(57) ABSTRACT

Time-scattering of data is employed to reduce the interference effects, such as, error rate, between terminals disposed in nearby beams, or cells, of a communication system. A scattering schedule is determined, typically by a gateway, for a terminal. Scattering instructions, based at least in part on that scattering schedule, are provided to the terminal. The scattering instructions provide terminals with information suitable for controlling the temporal scattering of time slot data to be transmitted by the terminals so that interference impact of nearby out-of-beam terminals is reduced. Time-scattered data received by a receiver remote from the terminal is returned to the desired order by sorting the data in accordance with the scattering schedule to achieve a reversing of the scattering. Time-scattering may be applied to data moving in either or both of the forward and reverse directions of a communication system.

32 Claims, 11 Drawing Sheets

U.S. PATENT DOCUMENTS

| | | | | | |
|---|---|---|---|---|---|
| 4,792,948 | A | * | 12/1988 | Hangen et al. | 370/376 |
| 4,896,266 | A | * | 1/1990 | Klashka et al. | 710/45 |
| 5,005,171 | A | * | 4/1991 | Modisette et al. | 370/522 |
| 5,436,942 | A | * | 7/1995 | Cheng et al. | 375/229 |
| 5,446,739 | A | * | 8/1995 | Nakano et al. | 370/337 |
| 5,544,075 | A | * | 8/1996 | Janex | 370/230 |
| 5,691,980 | A | * | 11/1997 | Welles et al. | 370/316 |
| 5,732,076 | A | * | 3/1998 | Ketseoglou et al. | 370/347 |
| 5,751,704 | A | * | 5/1998 | Kostic et al. | 370/335 |
| 5,933,794 | A | * | 8/1999 | Stalzer | 702/123 |
| 5,978,366 | A | * | 11/1999 | Massingill et al. | 370/337 |
| 6,018,528 | A | * | 1/2000 | Gitlin et al. | 370/436 |
| 6,034,960 | A | * | 3/2000 | Beshai et al. | 370/395.4 |
| 6,301,232 | B1 | * | 10/2001 | Dutta | 370/321 |
| 6,529,520 | B1 | * | 3/2003 | Lee et al. | 370/442 |
| 6,556,830 | B1 | * | 4/2003 | Lenzo | 455/450 |
| 6,563,806 | B1 | * | 5/2003 | Yano et al. | 370/330 |
| 6,842,437 | B1 | * | 1/2005 | Heath | 370/322 |
| 7,006,475 | B1 | * | 2/2006 | Suzuki et al. | 370/335 |
| 7,133,424 | B2 | * | 11/2006 | Becker et al. | 370/514 |
| 2001/0033604 | A1 | * | 10/2001 | Ando et al. | 375/147 |
| 2001/0048691 | A1 | * | 12/2001 | Chang et al. | 370/442 |
| 2003/0179769 | A1 | * | 9/2003 | Shi et al. | 370/442 |
| 2003/0193924 | A1 | * | 10/2003 | Gehring et al. | 370/345 |
| 2003/0227906 | A1 | * | 12/2003 | Hallman | 370/352 |
| 2004/0028071 | A1 | * | 2/2004 | Gehring et al. | 370/442 |
| 2004/0242163 | A1 | * | 12/2004 | Karr et al. | 455/73 |

FOREIGN PATENT DOCUMENTS

| | | | |
|---|---|---|---|
| JP | 2001257632 | A | 9/2001 |
| TW | 444453 | | 7/2001 |
| TW | 496080 | | 7/2002 |
| WO | 0233847 | A2 | 4/2002 |
| WO | 0233988 | A2 | 4/2002 |
| WO | 02056626 | A1 | 7/2007 |

OTHER PUBLICATIONS

Damondaran S. et al.: "Schedulign algorithms for multiple channel wireless local area networks" Computer Communications, Elsevier Science Publishers BV, Amsterdam, NL, vol. 25, No. 14, Sep. 1, 2002, pp. 1305-1314, ISSN: 0140-3664; p. 1307, left column, line 8, p. 1308, right column, line 5-23.

Taiwan OA dated Nov. 11, 2009 for Taiwan Application No. 092120112, 32 pages.

OA mailed Jun. 15, 2009 for EP Application Serial No. 08006314.2, 6 pages.

European Search Report mailed May 13, 2009 for European Patent Application Serial No. 08006314.2, 9 Pages.

* cited by examiner

| Slices (intervals) User 1 |
|---|
| 0-99 |
| 800-1199 |
| 3900-6899 |
| 7100-8099 |
| 12100-13899 |
| 21100-23699 |
| 32800-34599 |
| 43900-46899 |
| 54900-56199 |
| 63800-64399 |
| 68200-69999 |
| 72400-73599 |
| 86100-87899 |
| 92300-93199 |
| 98200-98399 |
| 105600-106099 |

FIG. 7

REDUCING INTERFERENCE BETWEEN USERS IN A COMMUNICATIONS SYSTEM THROUGH TIME SCATTERING

RELATED APPLICATIONS

This application claims the benefit of prior filed provisional application 60/398,278 filed on Jul. 23, 2002.

FIELD OF THE INVENTION

The present invention relates to the field of wireless communications. More particularly the present invention relates to the spreading of data communications over time to reduce the impact of relatively short duration noise.

BACKGROUND OF THE INVENTION

One access method that is utilized in communication by terminal devices in a wireless cellular system is time division multiplexing (TDM). In TDM, multiple sources are each assigned one or more different time slots in a set of time slots. Such a set of time slots is sometimes referred to as a frame. In Time Division Multiple Access (TDMA) communication, multiple terminal devices share a single frequency channel by dividing that channel into multiple time slots, with one or more time slots being assigned to each terminal device. In a typical TDMA system, the aggregate of these time slots, plus some overhead data bits, comprises a frame of data.

In a cellular or satellite system, users in other cells or beams, respectively, can cause interference among themselves when operating in the same or similar frequency bands. In the case of satellite communication, a user in one beam communicating to a satellite may be near an outer edge of this first beam and thus close to a second beam. In this case, if a user in the second beam is also at an edge of the second beam, which is close to the first beam, then these two users may produce inter-beam interference for each other. This is particularly true in the case of TDMA where inherently interference-resistant spread spectrum communication is not used. In such situations communications difficulties may arise in the forward, reverse, or both directions. In particular, with respect to users on the ground and near the edge of a beam, reverse interference depends on where the user unit and where the interfering unit are located within their respective beams.

Moreover, this inter-beam interference problem manifests itself more overtly on the reverse channel. When transmitting over the forward channel, a much smaller number of devices, i.e., gateways, will be transmitting to the satellite. In addition to typically being spaced apart from each other, these gateways transmit at a high power output. This high power output allows the signal to arrive at the satellite receiver with a relatively large signal to noise ratio. By comparison, on the reverse channel, terminal devices at the edges of separate beams may be relatively nearer to each other than are gateways. In addition, these small terminal devices typically have a relatively low power output as compared to gateways. Since these lower power output levels result in a smaller signal-to-noise ratio for terminal-originated transmissions arriving at a satellite receiver, users in separate beams may be more susceptible to inter-beam interference.

SUMMARY OF THE INVENTION

Briefly, the present invention includes methods and apparatus for reducing interference between terminals disposed in nearby beams, or cells, of a communication system, during TDM transmissions, including the scattering of time slot data.

A scattering schedule is determined, typically by a gateway, for a terminal. Scattering instructions based at least in part on that scattering schedule are provided to the terminal. The scattering instructions provide the terminal with information suitable for controlling, at least in part, the temporal scattering of time slot data which is to be transmitted by the terminals.

In accordance with another aspect of the present invention, time slot data are scattered into at least two disjoint (i.e., temporally non-contiguous) time intervals.

In accordance with yet another aspect of the present invention, scattering instructions may be provided in the form of an index to a collection of scattering approaches, a scattering table, or a scattering algorithm.

BRIEF DESCRIPTION OF THE DRAWINGS

Examples of the present invention are illustrated by way of the accompanying drawings. The drawings do not, however, limit the scope of the present invention. Similar references in the drawings indicate similar elements.

FIG. 7 is a tabular illustration of scattering instructions in accordance with one embodiment.

DETAILED DESCRIPTION OF EMBODIMENTS

Various embodiments of methods and apparatus in accordance with the present invention for reducing interference between users in a TDMA communications system by temporally reordering, or scattering, the transmission of data into alternative time slots, or intervals will now be described. While most of the described embodiments are in the context of a satellite communications network, the present invention is also applicable to any TDMA cellular system.

In the following description, various aspects of these embodiments will be described. However, it will be apparent to those skilled in the art that the present invention may be practiced with only some, or with all aspects of these embodiments. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Exemplary Operating Environment

Figure 1:
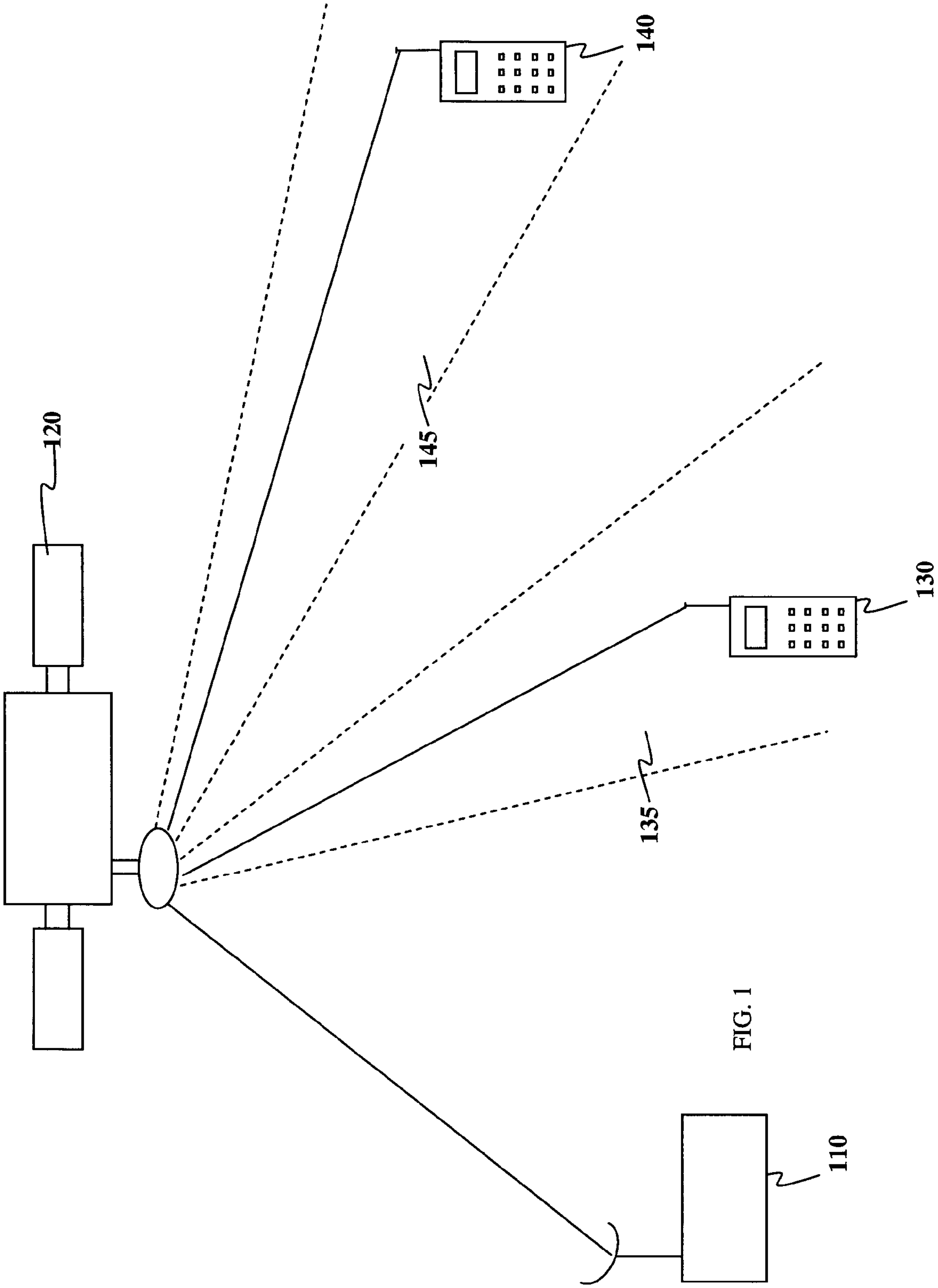
FIG. 1 illustrates a satellite system to which the present invention is applicable.

Referring now to FIG. 1, wherein a system to which the present invention is applicable, is shown. FIG. 1 shows a gateway 110 transmitting forward channel data to terminal devices 130, 140 through communications satellite 120. The terms base station and gateway are sometimes used interchangeably in the art, with gateways being perceived as specialized base stations that direct communications through satellites, while base stations use terrestrial antennas to direct communications within a surrounding geographical region. Terminal devices are also sometimes referred to as subscriber units, user terminals, mobile units, mobile stations, or simply "users", "mobiles", "terminals", or "subscribers". A first terminal device 130 receives transmissions from communications satellite 120 via a first beam 135 of communications satellite 120. A second terminal device 140 receives transmissions from communications satellite 120 via a second beam 145. Similarly, the first terminal device 130, and the second terminal device 140 transmit reverse channel data to gateway 110 through communications satellite 120. In this exemplary operating environment, terminal devices 130, 140 use TDMA, for access to the satellite 120 in the reverse direction, although alternative access methods may be used in connection with embodiments of the present invention.

Communications satellites form beams which illuminate a "spot", or area, produced by projecting satellite communications signals onto the Earth's surface. A typical satellite beam pattern for a spot comprises a number of beams arranged in a predetermined coverage pattern. Typically, each beam comprises a number of so-called sub-beams covering a common geographic area, each occupying a different frequency band. It is noted that the present invention is applicable in a variety of frequency reuse patterns (e.g., K=1, K=3, and so on). It is noted that the use of the letter "K" in designating frequency reuse patterns is well-known in this field. See page 566 of "Microwave Mobile Communications", edited by Jakes, and published by John Wiley, 1974, for discussion of frequency reuse patterns.

Time Scattering of Data

Figure 2:
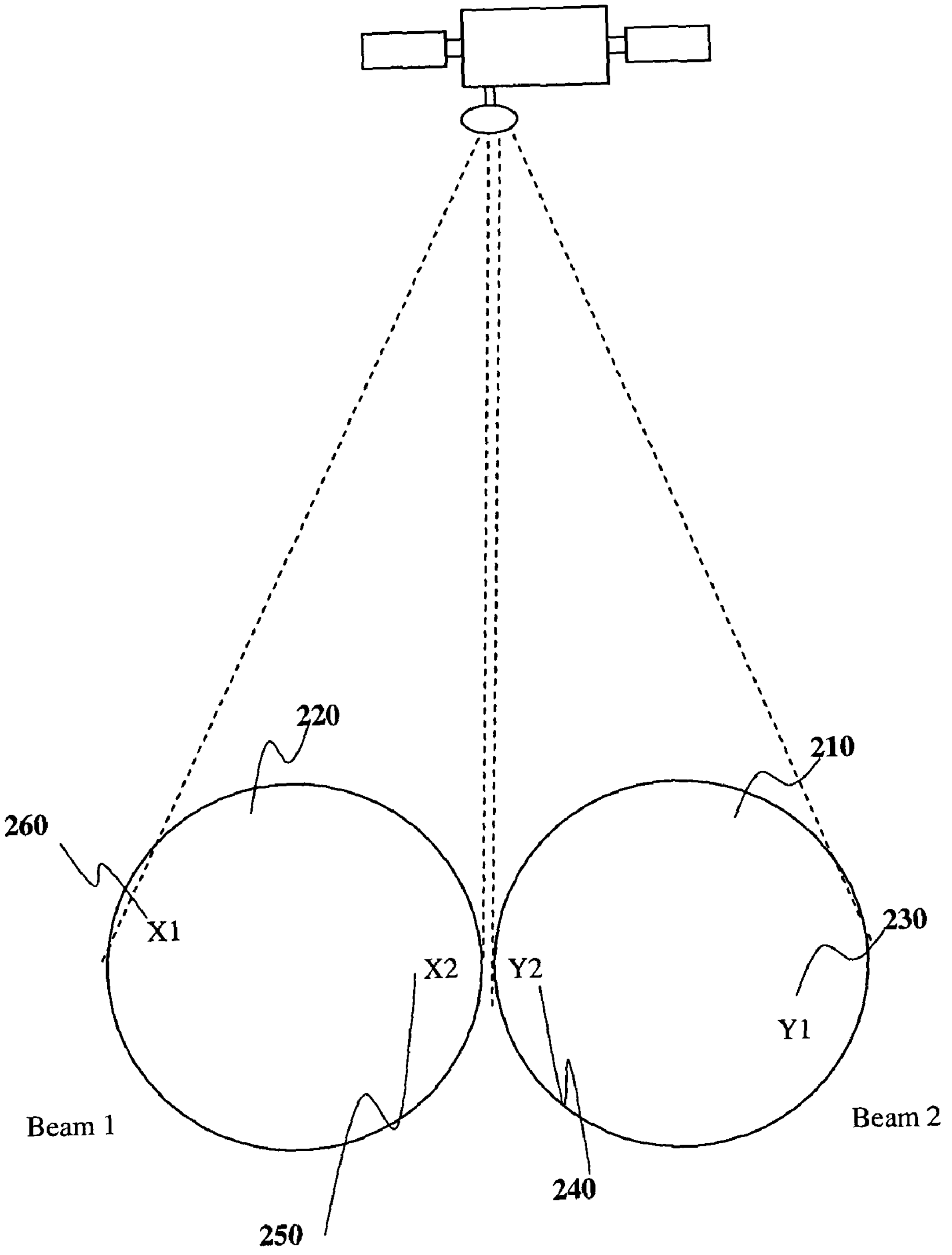
FIG. 2 is an illustration showing two beams for satellite communications with different users.

Interference between user transmissions has the potential to cause noticeable degradation in service for one or both users. For example, one effect of interference can be an increased error rate. With TDMA, unlike Code Division Multiple Access (CDMA), interference results from at least two users transmitting at the same time on the same or similar frequencies. In a CDMA system, interference is from a relatively large number of users, and because of this large number of interfering sources, it is generally the average interference that determines the error rate. However in a TDMA system, interference design is done for the worst case interference rather than for the average interference. FIG. 2 illustrates a situation in which two users may cause interference with each other. Referring to FIG. 2, two users, X1 260 and Y1 230, are shown with user X1 260 transmitting to, and receiving from, the satellite via Beam 1 220, and user Y1 230 transmitting to and receiving from the satellite via Beam 2 210. Each user is located on a far side of their respective beams as shown. As a result of the relatively large geographical displacement, the communications of users 260, 230, are not likely to interfere with one another, even though being at the respective edges of their beams produces a lower signal-to-noise ratio at the satellite.

Still referring to FIG. 2, two other users, X2 250 and Y2 240, each transmitting and receiving within a corresponding one of the beams, are shown. Both of users X2 250 and Y2 240 are, however, at locations where they are not only at the fringes, or edges, of their respective beams, hence having a weaker signal-to-noise ratio, but are also relatively close to each other. This relatively small geographical displacement between users 250, 240 can result in interference between the users' transmissions, i.e., inter-beam interference caused by the user's own transmissions. It is noted that the interference impact of either Y1 or Y2 is dependent on their distance to the edge of beam 220 of X1 and X2.

Various embodiments of the present invention provide methods and apparatus for reducing the effect of inter-beam, or inter-cell, interference. In various illustrative examples, spreading, that is, time-scattering of data, is used to partition the data of one or more time slots into smaller units. Those smaller units are then redistributed throughout a frame. Application of such time-scattering is useful at least in the context of reducing inter-beam interference between terminal-originated, i.e., reverse channel transmissions. Other applications are suitable for use with the present invention including forward channel communications. The present invention is suitable for use in a TDMA architecture, and other multiple access communication architectures.

Figure 3:
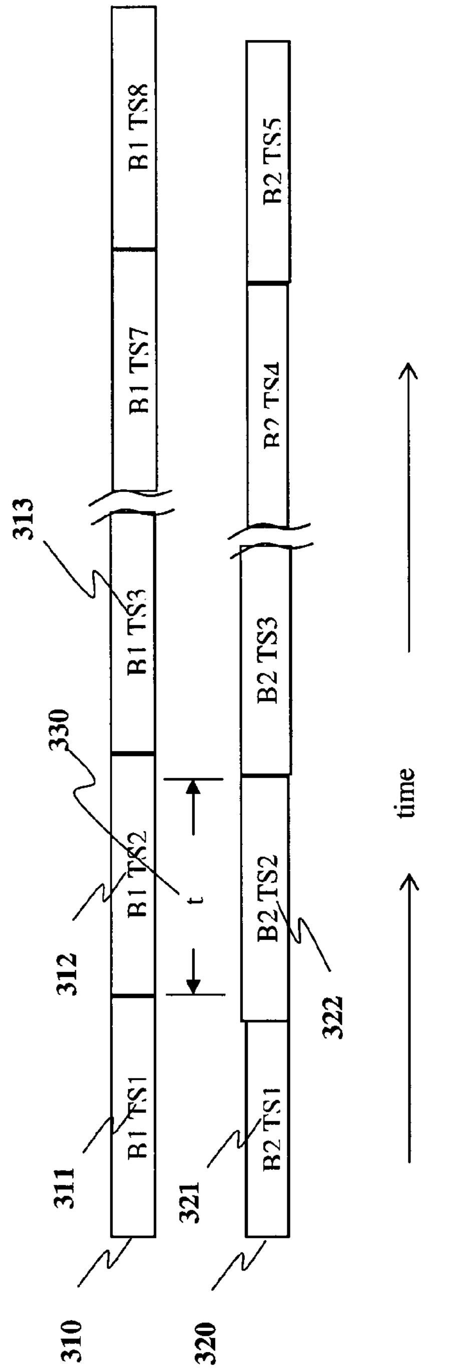
FIG. 3 is an illustration of two time frames for two adjacent beams.

FIG. 3 shows a pair of frames, one for each of two sets of reverse channel transmissions by users in two different beams. The two beams may be referred to as Beam 1 (B1) and Beam 2 (B2). Assume that users X1 260 and X2 250 use time slots one 311 and two 312, respectively, of a frame 310, and that users Y1 230 and Y2 240 use time slots one 321 and two 322, respectively, of a frame 320. For this example, users X2 250 and Y2 240 are transmitting simultaneously for a period t 330, which period corresponds to time slot two in each frames 310, 320. Thus, as previously mentioned, users X2 250 and Y2 240 will likely interfere with each other while concurrently transmitting due to their physical proximity to each other.

Figure 4:
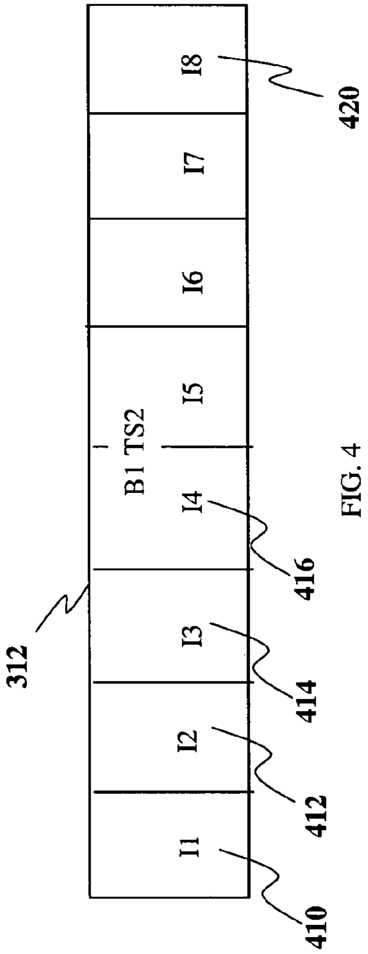
FIG. 4 is an illustration of one embodiment showing the division of a time slot into intervals.

FIG. 4 shows time slot two 312 of frame 310 in further detail. In accordance with one embodiment, a time slot is divided into intervals, and in particular, the time slot shown is divided into intervals I1 410-I8 420. In the illustrative embodiment of FIG. 4, time slots for all other frames are similarly partitioned into intervals as well. In alternative embodiments, less than all the time slots are partitioned into intervals.

Figure 5:
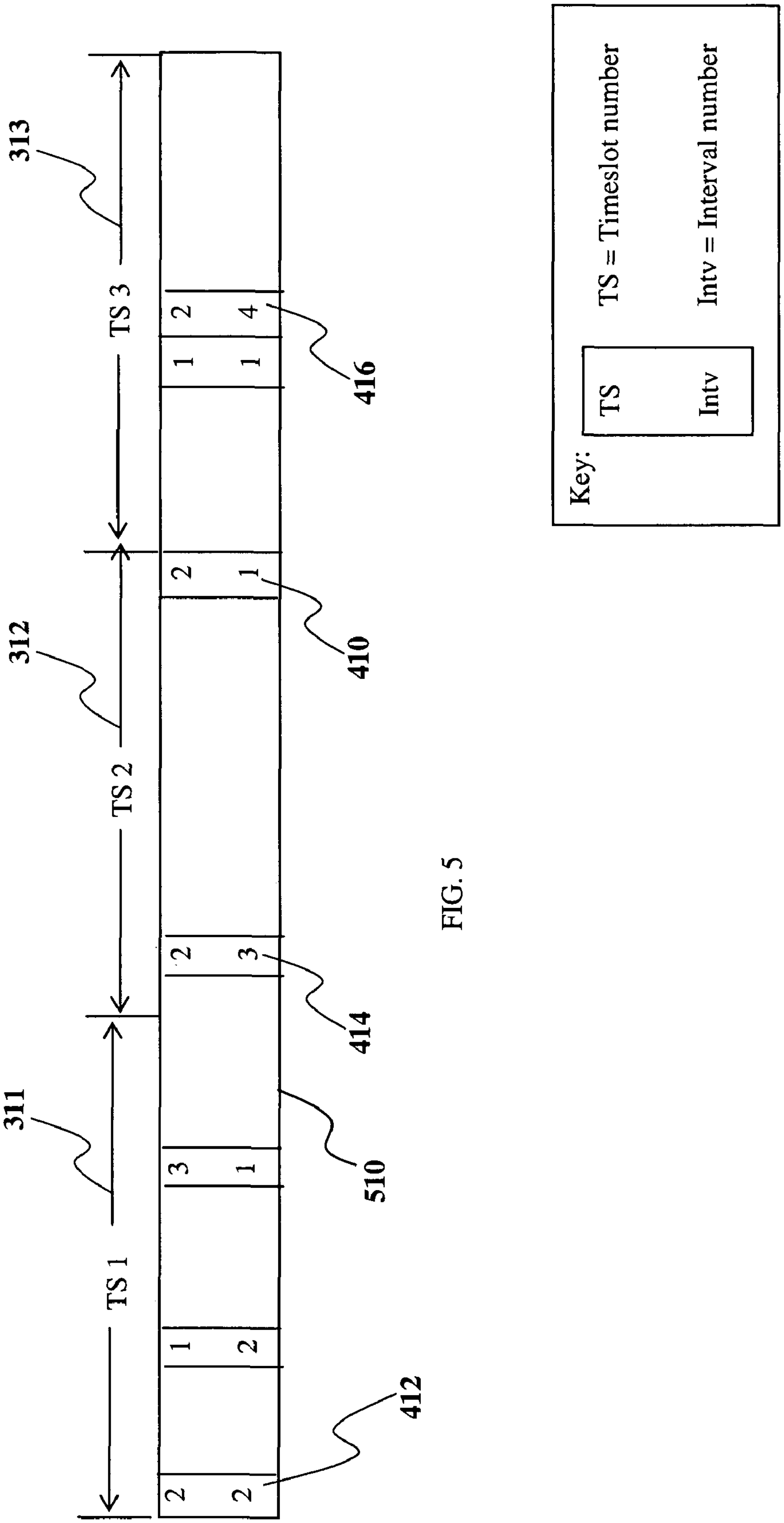
FIG. 5 is an illustration of a frame partially filled with time slot data divided into intervals.

FIG. 5 shows a frame partially filled with interval data. The data, in intervals, are scattered through a frame. Thus, interval I1 410 of time slot two from the frame is shown at its appropriate position within the frame 510. Similarly, intervals I2-I4 412-416 of time slot two are also shown. Shown for reference, in FIG. 5 are the original time slots TS1-TS3 312-313 of the frame 310 which is shown in FIG. 3. Thus, the intervals of the original time slot two of frame 310 are now scattered throughout the frame. It is noted that, in the digital domain, interval data may comprise a single bit of data, or multiple bits of data.

In one embodiment, the scheme for dividing the data of a given time slot into intervals and scattering the data throughout the frame, is provided by one or more scattering instructions. In this illustrative embodiment, the scattering instructions are provided to the terminal device 130 by the gateway 110. For example, in one embodiment, the scattering instructions may be provided, via communication on the forward channel, as an algorithm for determining the method of dividing the data associated with a time slot into intervals in addition to the scattering pattern for placing the intervals into the frame. In another embodiment, scattering instructions are provided using communication on the forward channel, as an index to one of a plurality of locally stored sets of instructions for performing the dividing and scattering. In another embodiment, scattering instructions are provided, via the forward channel, as one or more tables of information which can be used by the terminal device for performing the scattering operation.

The scattering of data as described above, can be viewed as a temporal reordering, or redistribution, or even as a rescheduling, of at least portions of the data nominally scheduled for transmission in a given time slot, to one or more other time slots. Such scattering of data to one or more other time slots may include scattering to other time slots within a given frame, to other time slots in other frames, or to other time slots both within the originally scheduled frame and to other frames. It is noted that scattering of data from an originally scheduled time slot to one or more other time slots may include scattering of all, or less than all, of the data from that original time slot.

Figure 6:
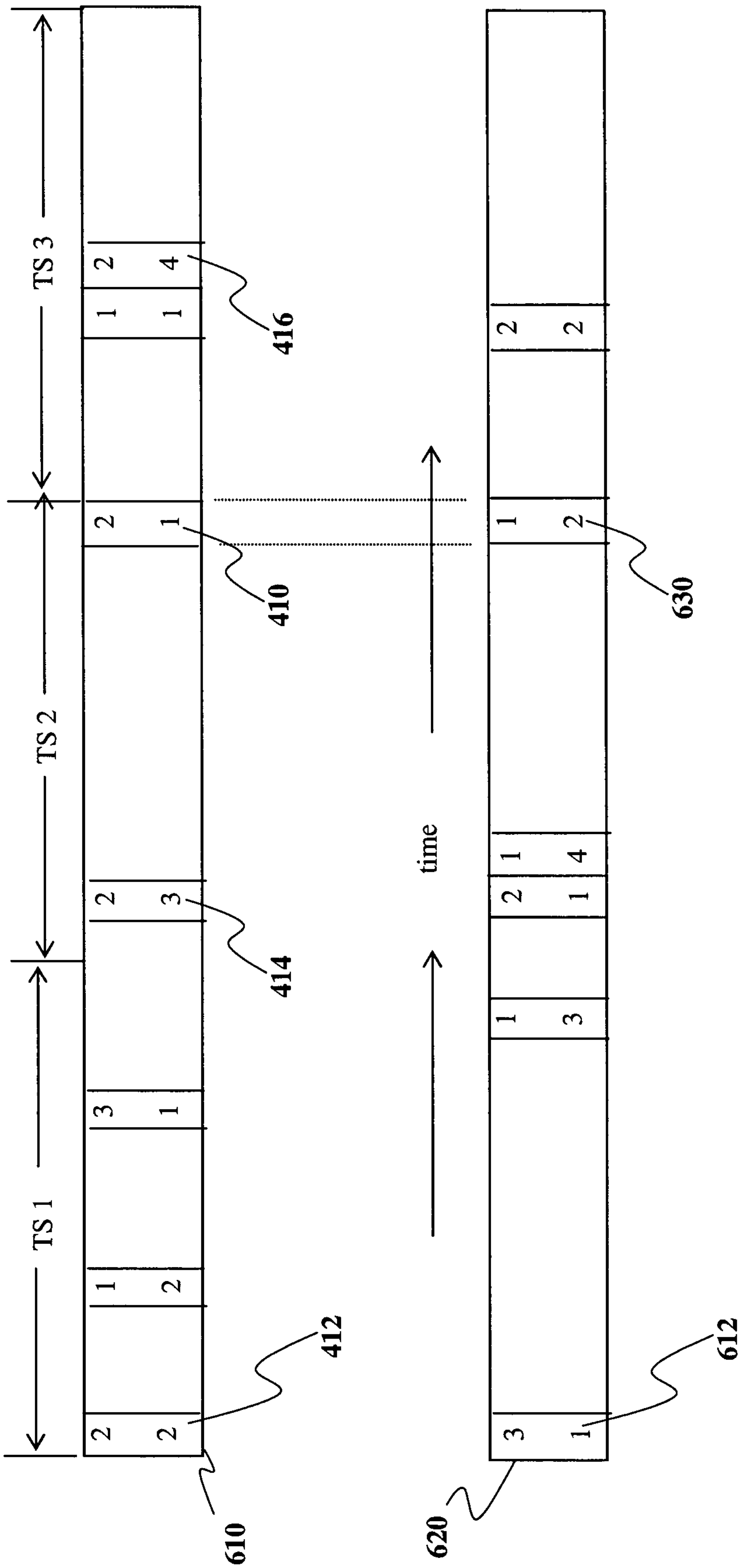
FIG. 6 is an illustration showing two frames, one for each of two adjacent beams each with time slot data divided into intervals.

FIG. 6 illustrates two frames 610, 620, resulting from having been subjected to a scattering process. As is described in more detail below, such rescheduling tends to reduce the amount of data subject to interference from two nearby terminals, or users, because the data comprising the transmissions of those two nearby terminals is not all transmitted concurrently. Referring now to FIGS. 4-6, it can be seen in frame 610, that as a result of such scattering, the first interval 410 (of second time slot 312) is now temporally aligned with the transmission of the second interval 630 of first time slot of frame 620. Similarly, the second interval 412 (of second time slot of frame 610) temporally corresponds to the first interval of the third time slot 612 of frame 620. Recall that, with the interference problem associated with time slot two 312 of frame 310, and timeslot two 322 of frame 320, the issue was that a substantial amount of one time slot, and thus the one terminal in particular associated with that timeslot, was being interfered with. By performing scattering for the entire communication of the data associated with time slot two, differing corresponding time slot data from various time slots of the nearby users interferes with the data of a single time slot of Beam 1. Therefore, the scattering disclosed herein effectively performs an averaging in error rate amongst the slots of users. Resultantly, interference effects between users may be reduced.

In some conventional TDMA communication systems, data is transmitted and received in fixed portions of a frame via the assignment of fixed length time slots. However, the terminal devices may not have a fixed portion of a frame (i.e., a fixed number of time slots) assigned to them. The amount of a frame dedicated to a terminal device can vary since the amount of data communicated to/from a terminal varies with time. One terminal device may be involved with infrequent, sporadic communications whereas a second terminal device may have frequent, constant communications. Thus, to satisfy the requirements of both terminals, the first terminal requires a lesser portion of a frame than does the second terminal. Additionally, the portion of a frame required by a terminal may change frequently, e.g., several times a second. In such communication systems, each terminal device may periodically provide information to the gateway describing its current requirements for transmission of data. The gateway will then allocate portions of a frame to each terminal device for an upcoming period of time. In this manner, the portion of a frame, associated with a given terminal varies with time. It is noted that the portion of a frame in a TDMA system allocated to a terminal is typically, but not required to be, measured in units corresponding to time slots.

A communications frame can be divided into smaller pieces than a "traditional" number of time slots as previously described. Using the traditional definition of fixed time slots, given a frame duration of 90 milliseconds and eight users per channel, each user will be allocated a time slot lasting 11.25 milliseconds. This may not be a desirable allocation among the users, as one user may have nothing to transmit while another may have a greater amount of data to transmit than usual. Various methods, can be used to divide the frame among the users in a variable manner.

In one method, it is possible to use a predetermined dividing rate to divide a frame of data into a number of micro time slots, which may also be referred to as "chips", "tokens", or "slices". For example, assume, for illustration purposes, that a TDMA frame is divided by a dividing rate of 1.0 Mslices/second and that a system utilizes the aforementioned frame duration of 90 milliseconds and eight users per channel. If a dividing rate of 1.0 Mslices/second is used to divide the frame, then each 90-millisecond frame, instead of being divided into eight timeslots, will be divided into 90,000 slices. In the context of a traditional fixed rate TDMA system, a first user assigned to time slot one would be assigned slices 0-11249, a second user assigned to time slot two would be assigned slices 11250-22499, and so on. With the flexible timeslot system described above, however, a user with a "busy" time period may be assigned a larger number of slices than a user with less information to be transmitted. For example, a busy user may be allocated 20,000 slices whereas a user with no activity may be allocated no slices. In other words, the slices can act as a quantum of transmission time that can be allocated by a gateway in a near real-time fashion. It is noted that such an allocation scheme is referred to as "near real-time" because the gateway must first learn of the terminals' need for channel capacity, compute the new time slot assignments in accordance therewith, and finally communicate with the terminals prior to the terminals recognizing the newly assigned time slots.

In an illustrative embodiment, the information provided to a terminal may comprise a list of "slices", that is, time intervals, that the terminal is to use during its transmission. For example, a user requests expanded access for transmission due to an increase in traffic, and, based on the amount of access requested, the gateway decides to allocate 20,000 slices to the terminal to support the data traffic requirements of that user. As a result, to perform the temporal scattering, the gateway provides a list of slice numbers to the terminal for its use when transmitting. Slice numbers may also be referred to as slice identifiers, time interval identifiers, or similar expressions. Thus, the user may have the slices assigned to it as shown in FIG. 7. FIG. 7 shows two columns of data, the first column of data contains the slice number of user one's data for transmission. The second column shows the slice location in a data frame for user one to transmit that data. Similarly, user two may only require 2100 slices and have slices 100-199, 2400-3399, and 37800-38799 assigned to it. When the assignments are sent to all users of a channel (eight in this example), all slices will be properly assigned. In this embodiment, the data is temporally separated into non-adjacent time intervals, i.e., slices, in the order it would otherwise be transmitted. In another embodiment, the data to be transmitted is reordered resulting in the transmission of data that is temporally scattered and reordered. As previously discussed, the information regarding scattering can be provided to a transmitting unit in various forms such as, for example, algorithmic instructions, tabular instructions, or as a look up index into a local database containing details on scattering.

Usage of Scattering Instructions

Figure 8:
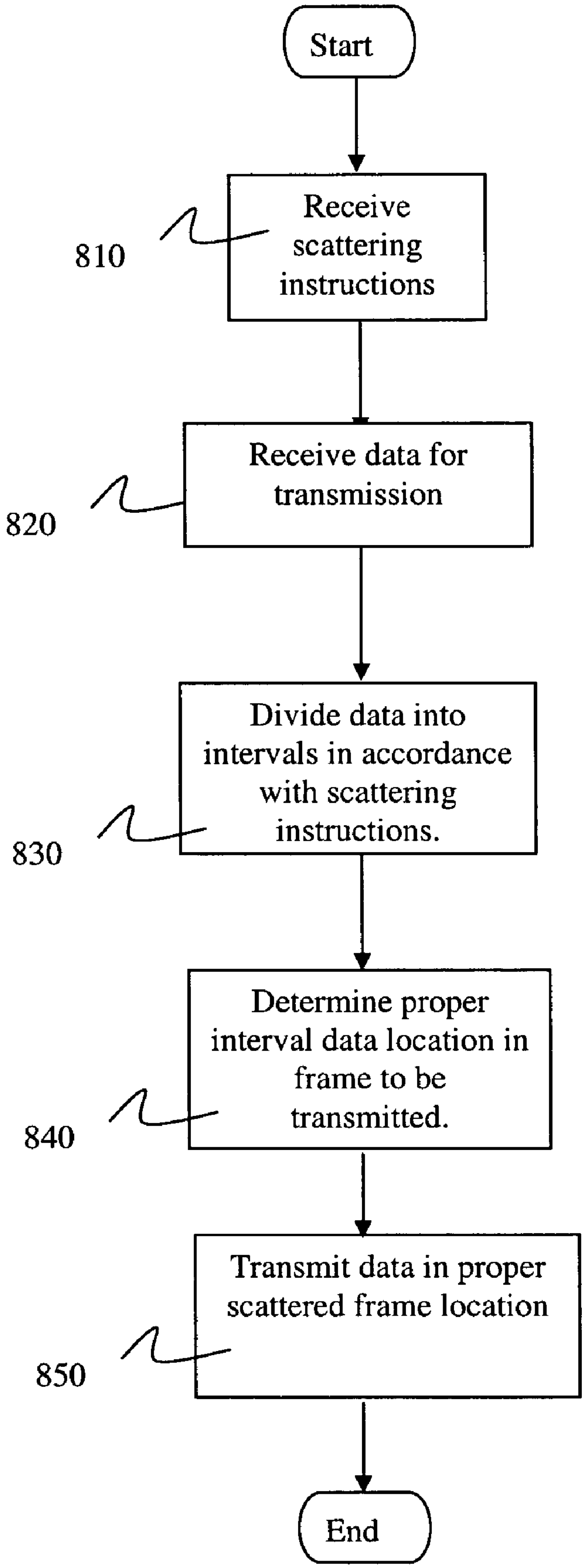
FIG. 8 is a flowchart illustrating the function of a terminal in accordance with one embodiment.

Referring now to the illustrative process shown in the flowchart of FIG. 8, a terminal receives 810 scattering instructions, or time-scattering control information, which typically originated at a gateway. The scattering instructions provide information that is used by the terminal to accomplish scattering of the data within a frame, or across a plurality of frames. For example, in one embodiment, the scattering instructions are in the form of a set of rules, or one or more equations, for generating the desired scatter pattern for the data to be redistributed throughout the frame. In another embodiment, a table of scattering locations is provided as part of the scattering instructions. In this embodiment, a look-up table is provided such that, after a terminal has divided data for a time slot into intervals, the table provides a beginning location in the frame for each interval. In another embodiment, the terminal contains a predefined set of scattering patterns each in a separate table. In this embodiment, the scattering instructions contain an index into this predefined set of scattering patterns defining which of the predefined set of tables to use when reordering the data.

After determination of how the data is to be scattered, the terminal is ready to begin processing of user data. The terminal receives data to be transmitted, at 820. It is noted that the terminal may receive data for transmission in a variety of ways, including but not limited to, converting voice input to data, converting keypad entries to data, internally generating status information, and receiving information by wired or wireless link from other electronic products. The terminal divides the time slot data into the appropriate number of intervals, at 830. In one embodiment, each interval size is the same in duration. In another embodiment, the interval size varies such that within a single frame different interval durations exist.

After the data has been divided into the proper number of intervals, the intervals are placed in a queue, at 840, in the specified temporal order, for transmission. In one embodiment, the information about the temporal placement of the intervals is provided by a look-up table in a memory device. Such look-up tables may be stored in a memory that is contained within the terminal, or in a memory that is remote from, but communicatively coupled to, the terminal. Such memory, may be volatile or non-volatile as is understood by those skilled in the art. In such a look-up table, a beginning transmission offset in a frame is provided. In another embodiment, the scattering instructions contain a formula for determining the start location of each interval within the frame.

After the proper interval placement is determined, the terminal then transmits the data in accordance with the determined interval placement, at 850. In one embodiment, each interval of data is transmitted using the same modulation techniques. In alternative embodiments, various intervals may be transmitted using differing modulation techniques. In one embodiment, the look-up table specifies which modulation technique is to be used for specific intervals. In other embodiments, the look-up table provides one or more factors to be used in determining which modulation technique to use for specific intervals.

Figure 9:
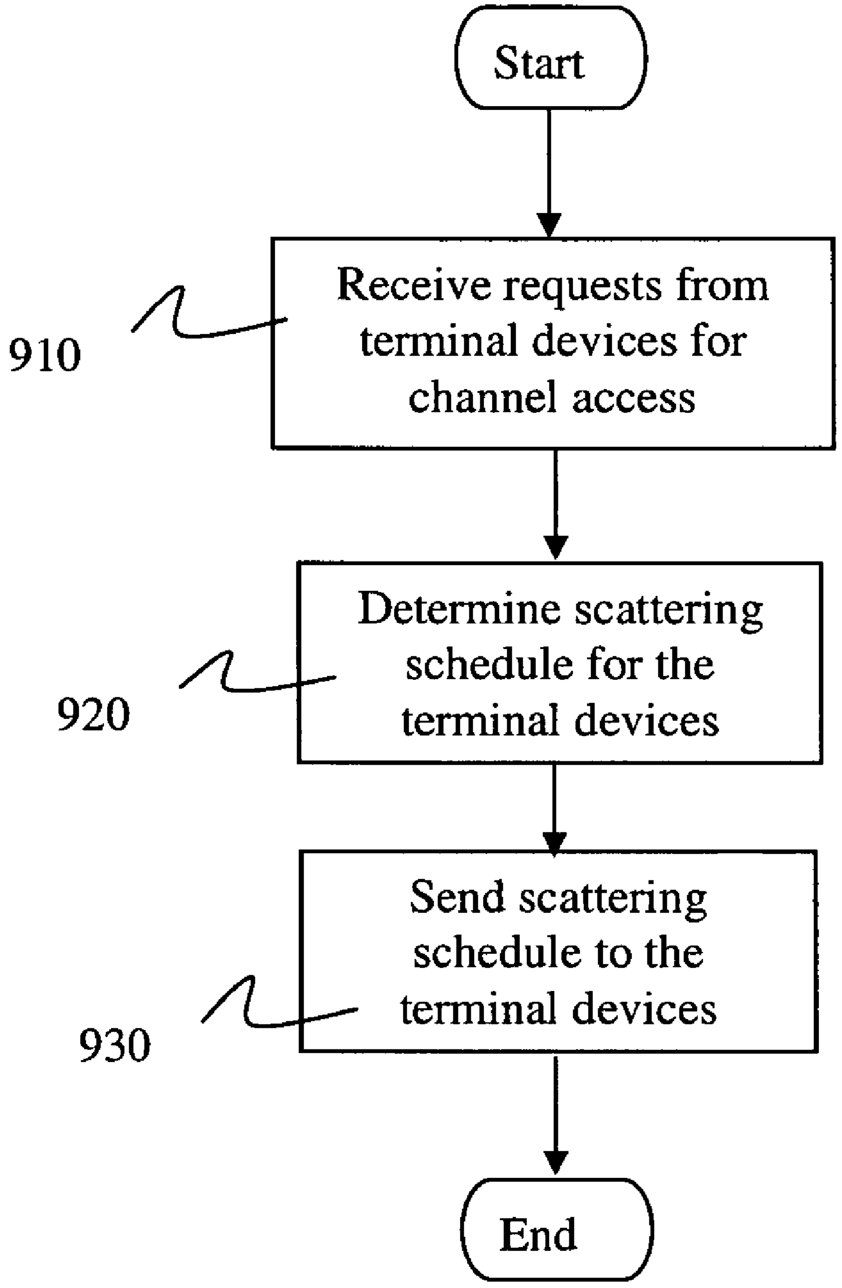
FIG. 9 is a flowchart illustrating the function of a gateway.

FIG. 9 is a flowchart of an illustrative a process, in accordance with the present invention, that receives requests for channel access from terminals, determines a scatter schedule and sends the schedule to the terminals. In this illustrative embodiment, the gateway receives 910 from one or more of a plurality of terminals, requests for access to a communications channel. Subsequently, the gateway determines, or generates, 920 scattering instructions for the one or more terminals. The instructions are generated based on a schedule developed by the gateway. In one embodiment, the schedule is developed to increase the throughput of terminals requesting access. In another embodiment, the gateway prioritizes requests based on a predetermined prioritization scheme. After the scattering instructions are established for each terminal, the gateway informs the terminals (i.e., transmits to the terminals) 930 regarding their respective scattering instructions. In one embodiment, the scattering instructions may be sent to a terminal as part of a special message. In another embodiment, the scattering information is contained in a general configuration packet that is sent to each terminal.

Figure 10:
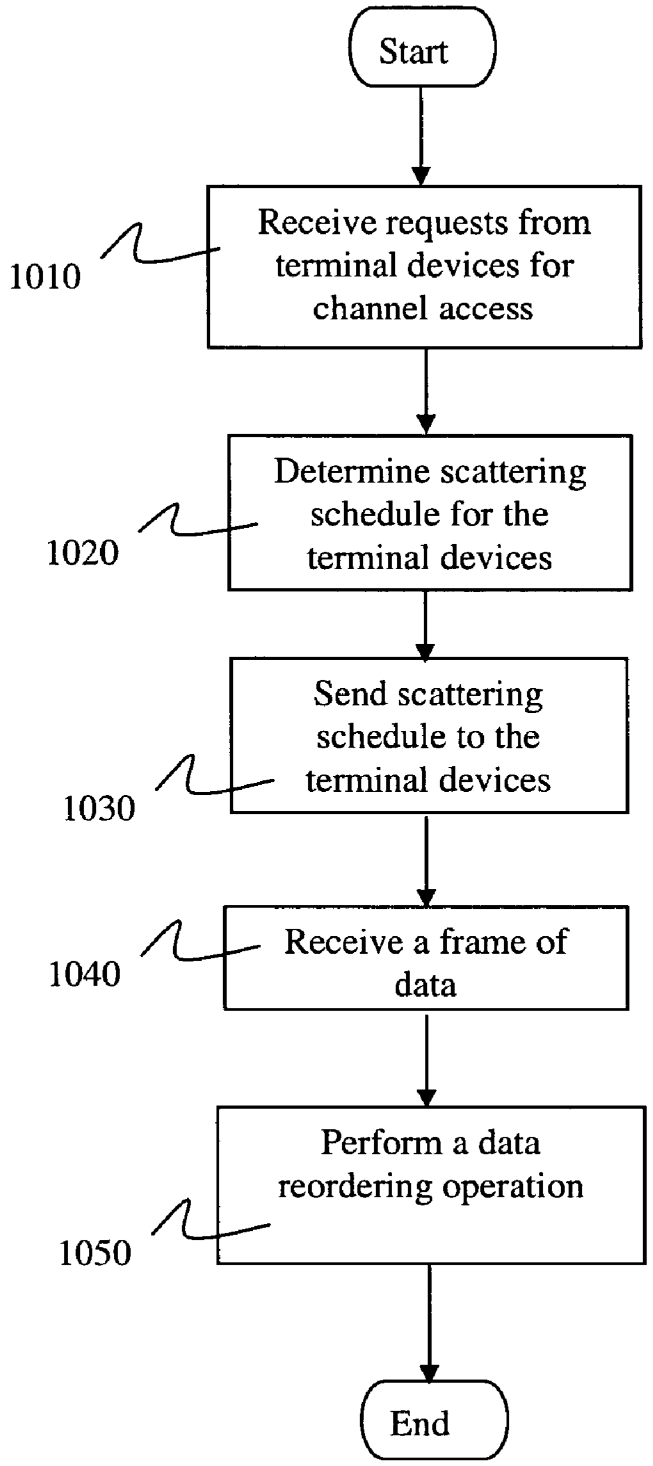
FIG. 10 is a flowchart illustrating a process that transmits time scattering instructions, receives data, and performs a data reordering operation.

FIG. 10 shows another process in accordance with embodiments in which time-scattered data is received from user terminals and is then reordered. In this illustrative embodiment, the gateway receives 1010 one or more terminal requests for access to a channel. Subsequently, the gateway determines, or generates, 1020 a scattering schedule. The gateway then sends 1030 the scattering schedule to the terminals. After the scattering schedule is sent to the terminals, the gateway monitors the reverse channel in accordance with the scattering schedule. When a frame is received 1040, the gateway reorders 1050 the data into its proper format. The reordering can be performed by applying a reverse transformation to the frame in accordance with the scattering schedule. Such reordering is not typically computationally intensive since the scattering order is known in advance. One simple approach to reordering is to store the received data (one or more frames depending on the scattering instructions) in a buffer memory and then to sequentially read out data in accordance with true temporal order by using the scattering sequence as a reverse index into the stored data.

Figure 11:
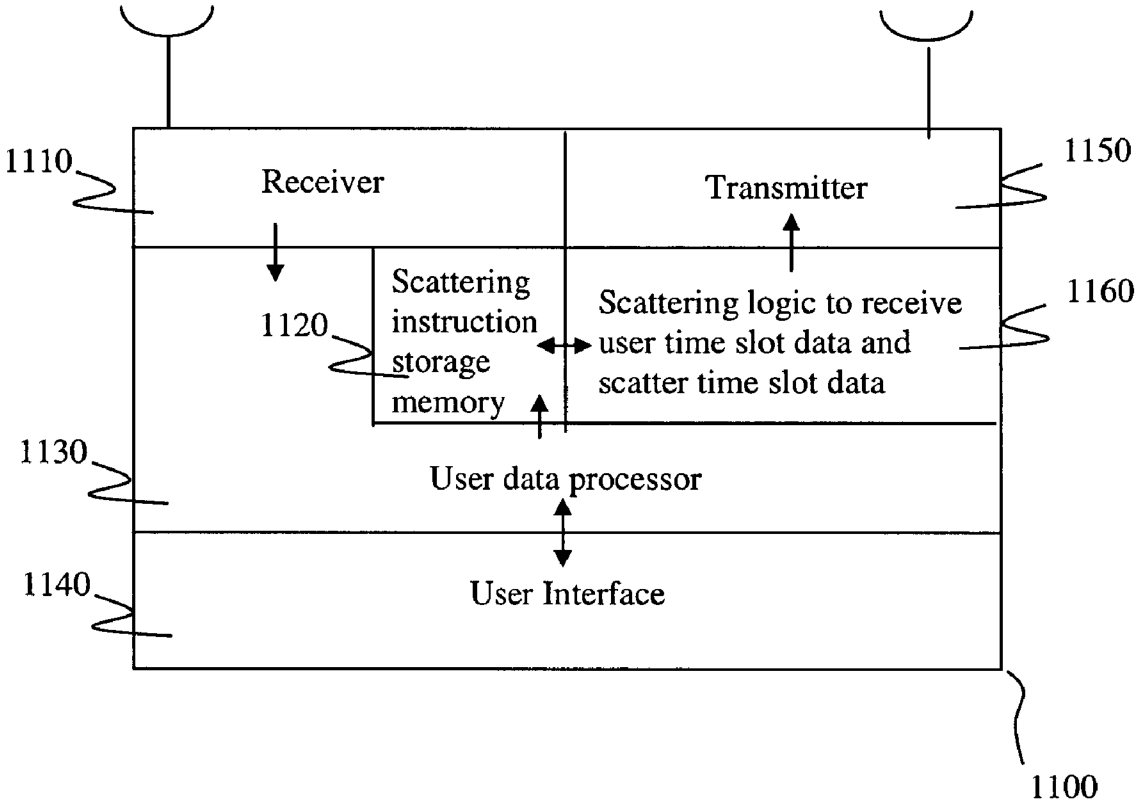
FIG. 11 is a schematic block diagram of a terminal device.

FIG. 11 is a schematic block diagram of a terminal in accordance with the present invention. Terminal 1100 includes a receiving unit 1110 and a transmitting unit 1150 for communicating with a communications satellite (not shown). User interface 1140 is coupled to user data processor 1130, and is operable to obtain information from, and to provide information to a user (not shown). User interface 1140 may include, but is not limited to, voice interface circuitry, such as that which may be found in a cellular phone; infrared or RF interfaces for receiving messages from other electronic products; and so on. User data processor 1130 is operable to receive data containing scattering instructions from receiver 1110, and to store the scattering instructions in a scattering instructions storage memory 1120. User data processor 1130 may be a commonly available microprocessor or microcontroller in combination with the software or firmware necessary for the aforementioned interface functions. The development of such interface software for execution by commonly available microprocessors or microcontrollers is well-known in the art. Alternatively, user data processor 1130 may be implemented with combinational logic, which in turn may be fabricated as an application specific integrated circuit (ASIC), or as part of a larger System on a Chip (SoC) integrated circuit.

In the illustrative embodiment, data processor 1130 receives information from the user via user interface 1140 and provides a preprocessed TDMA time slot data to a logic block referred to as scattering logic 1160. Scattering logic 1160 operates upon the time slot data and, in accordance with the scattering instructions stored in the scattering instruction storage memory, divides the time slot data into intervals and reorders for transmission via transmitter 1150. Such reordered data may be stored for subsequent transmission during the appropriate frame and time slot.

Figure 12:
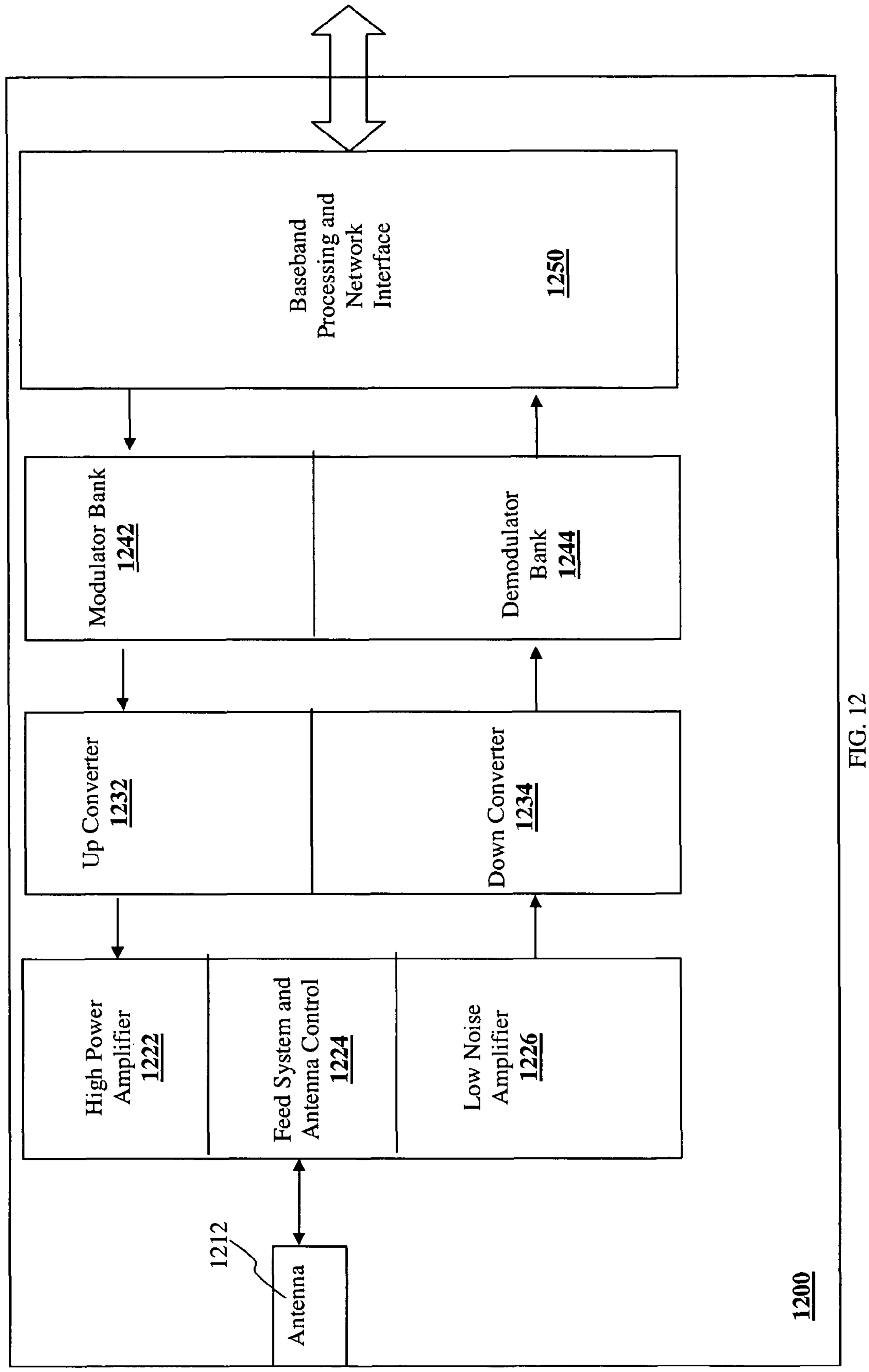
FIG. 12 is a schematic block diagram of a gateway, within which an embodiment of the present invention may be practiced.

FIG. 12 illustrates an example gateway, within which an embodiment of the present invention may be practiced. Example gateway 1200 includes antenna 1212, amplifiers 1222 and 1226, feed system and antenna control 1224, up/down converters 1232 and 1234, modulator/demodulator banks 1242 and 1244, and baseband processing and network interface 1250. In particular, baseband processing and network interface 1250 includes the time scattering control of the present invention.

Transmit data are received, processed and encoded by the baseband processor and network interface 1250, and then modulated onto a signal by modulator 1242. The modulated signal is up-converted by up-converter 1232 and amplified through high power amplifier 1222. The amplified signal is then fed to antenna 1212 through feed system and antenna control 1224, for transmission.

Received signals are amplified by the low noise amplifier 1226. The amplified signals are then down-converted by down-converter 1234 and demodulated by demodulator 1244. Data recovered from the demodulated signals are processed by baseband processing and network interface block 1250, and provided to other elements of the communication system of which gateway 1200 is a part. Baseband processing includes a processor and memory for storing instructions to be executed by the processor.

Except for baseband processor and network interface 1250 being incorporated with the teachings of the present invention, other enumerated elements represent a broad range of such elements known in the art. Moreover, other gateway or gateway-like apparatus, such as a base station, may have more or less of these elements, or have some of these elements substituted with other equivalent and/or extension elements.

CONCLUSION

Message delivery in accordance with the present invention provides for dividing data, which is associated with time slots, into sub-units or intervals, which are spread throughout a plurality of time slots in a frame, or across a plurality of frames. These sub-units may be referred to as chips, tokens, or slices. Scattering instructions for each terminal device are typically provided by a gateway. Terminal devices scatter the nominal time-ordering of data throughout a frame, or frames, as instructed. The gateway receives the time-scattered data and performs a reordering operation to regain the original time-ordering of the data.

It is noted that the time-scattering of the present invention is suitable for use in both the forward and reverse directions of a communication system. For example, in an alternative embodiment, a gateway provides a de-scattering schedule to a plurality of terminal devices and then transmits a plurality of time-scattered data to the plurality of terminal devices. The de-scattering schedule essentially is the information needed by a terminal to recognize which parts of the data frame are intended for that terminal, and also how to reorder the received data to reconstruct the intended information. It is noted that applications of the present invention in the forward direction generally also incorporate power control.

An advantage of embodiments of the present invention is reduction of error rate, on average, between users disposed in nearby beams or cells of wireless communication. Such nearby beams may be adjacent, or spaced apart. The reduction in error occurs because the interfering chips or tokens falling on a given users chips or tokens come from multiple interfering users, each with different interfering strength, so the interference effect tends to be averaged out.

Various aspects of the present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, micro-controller, or general-purpose computer.

The present invention can be embodied in the form of methods as well as apparatus for practicing those methods. The present invention can also be embodied in the form of program code embodied in tangible media, such as punched cards, magnetic tape, floppy disks, hard disk drives, CD-ROMs, flash memory cards, or other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a processor, the machine becomes an apparatus for practicing the invention. When implemented on a general-purpose processor, the program code segments combine with the processor to provide a unique device that operates analogously to specific logic circuits.

It is to be understood that the present invention is not limited to the embodiments described above, but encompasses any and all embodiments within the scope of the subjoined claims.

What is claimed is:

1. A method for transmitting data in a communication system wherein the data is transmitted in a communication frame, the communication frame comprising a set of time slots, the method comprising:

receiving one or more scattering instructions from a gateway;

dividing data corresponding to a time slot in the set of time slots into a plurality of intervals in accordance with the one or more scattering instructions, wherein each interval in the plurality of intervals comprises a duration which is shorter than a duration of the time slot;

scattering at least a portion of the plurality of intervals to one or more disparate time slots in the set of time slots based upon the one or more scattering instructions, wherein the portion of the plurality of intervals are scattered non-contiguously; and transmitting the data in accordance with locations of the plurality of intervals within the communication frame, wherein the one or more scattering instructions comprise an algorithm for temporally scattering the data.

2. The method of claim 1, further comprising receiving configuration information, wherein the one or more scattering instructions are included with the configuration information.

3. The method of claim 1, wherein the one or more scattering instructions comprise an index into a memory of stored time-scattering control information.

4. The method of claim 3, wherein the memory is disposed within a terminal device.

5. The method of claim 1, wherein the one or more scattering instructions comprise a table of information that indicates a temporal scattering of the data.

6. The method of claim 5, wherein the table of information specifies, by a time interval identifier, a starting location for scattered data.

7. A terminal device transmitting data in a communication system, comprising:

a receiver configured to receive one or more scattering instructions from a gateway device;

a processor configured to:

divide data associated with a time slot of a communication frame into a plurality of intervals in accordance with the one or more scattering instructions, wherein each interval comprises a shorter duration than the time slot;

distribute the plurality of intervals among one or more disparate time slots in the communication frame based at least in part on the one or more scattering instructions, wherein the plurality of intervals are distributed non-contiguously; and a transmitter configured to transmit the plurality of intervals in accordance with locations of the plurality of intervals within the communication frames, wherein the one or more scattering instructions comprise an algorithmic indication of how to scatter the intervals.

8. The terminal device of claim 7, wherein the receiver is further configured to receive configuration information, wherein the one or more scattering instructions are included with the configuration information.

9. The terminal device of claim 7, wherein the one or more scattering instructions comprise an index into a memory.

10. The terminal device of claim 9, wherein the memory stores time scattering control information.

11. The terminal device of claim 7, wherein the one or more scattering instructions comprise a table of information that indicates a temporal scattering of the data.

12. A method, comprising:

receiving a request from a terminal device for access to a communications channel;

generating a schedule of transmission for the terminal device, wherein the schedule of transmission specifies a division of data into a plurality of time intervals, each time interval shorter in duration than a time slot of a communication frame, the schedule of transmission further specifies a location of each time interval from the plurality of time intervals within the communication frame, wherein the plurality of time intervals are located within the communication frame in a non-contiguous manner;

generating one or more scattering instructions in accordance with the schedule of transmission;

transmitting the one or more scattering instructions to the terminal device;

receiving data from the terminal device, transmitted in a scattered manner per the one or more scattering instructions; and reordering the data in accordance with the schedule of transmission to obtain the data in an originally intended order.

13. The method of claim 12, wherein receiving the request comprises receiving an indication of the amount of data queued at the terminal device for communication.

14. The method of claim 12, wherein the schedule of transmission comprises a list of the plurality of time intervals.

15. The method of claim 14, wherein each time interval comprises a starting location in the communication frame and a transmission duration.

16. The method of claim 15, wherein the communication frame is divided into a number of time intervals in accordance with a dividing rate.

17. The method of claim 15, wherein the starting location comprises a time slot and the transmission duration comprises a number of time intervals.

18. The method of claim 15, wherein the starting location comprises a first time interval identifier and the transmission duration comprises a second time interval identifier.

19. The method of claim 12, further comprising transmitting modulation control information for time scattered data.

20. An apparatus, comprising:

means for receiving a request from a terminal device for access to a communications channel and for wirelessly receiving scattering instructions;

means for generating a schedule of transmission for the terminal device, wherein the schedule of transmission specifies a partition of data into a plurality of time intervals, each time interval shorter in duration than a time slot of a communication frame, the schedule of transmission further specifies a location of each time interval from the plurality of time intervals within the communication frame, wherein the plurality of time intervals are located within the communication frame in a non-contiguous manner;

means for generating one or more scattering instructions in accordance with the schedule of transmission;

means for transmitting the one or more scattering instructions to the terminal device;

means for receiving data from the terminal device, the data transmitted in a scattered manner in accordance with the one or more scattering instructions; and means for reordering the data in accordance with the schedule of transmission to obtain the data in an originally intended order.

21. The apparatus of claim 20, wherein the means for receiving the request comprises means for receiving an indication of an amount of data queued at the terminal device for communication.

22. The apparatus of claim 20, wherein the means for generating the schedule of transmission comprises means for generating a list of the plurality of time intervals.

23. The apparatus of claim 22, wherein each time interval comprises a starting location in the communication frame and a transmission duration.

24. The apparatus of claim 20, further comprising means for transmitting modulation control information for the time scattered data.

25. The apparatus of claim 20, wherein the communication frame is divided into a number of time intervals in accordance with a dividing rate.

26. A terminal device for transmitting data in a communication system wherein the data is transmitted in a communication frame, the communication frame comprising a set of time slots, the terminal device comprising:

means for receiving one or more scattering instructions from a gateway; means for partitioning data corresponding to a time slot in the set of time slots into a plurality of intervals in accordance with the one or more scattering instructions, wherein each interval in the plurality of intervals comprises a duration which is shorter than a duration of the time slot;

means for scattering at least a portion of the plurality of intervals to one or more disparate time slots in the set of time slots based upon the one or more scattering instructions, wherein the portion of the plurality of intervals are scattered non-contiguously;

means for transmitting the data in accordance with locations of the plurality of intervals within the communication frame;

means for receiving data from the terminal device, the data transmitted in a scattered manner in accordance with the one or more scattering instructions; and means for reordering the data in accordance with the schedule of transmission to obtain the data in an originally intended order.

27. The terminal device of claim 26, further comprising means for receiving configuration information, wherein the one or more scattering instructions are included with the configuration information.

28. A non-transitory machine-readable storage medium embedded with computer code which when being executed by a processor to perform step of, comprising:

causing at least one computer to receive one or more scattering instructions from a gateway device;

causing the at least one computer to divide data associated with a time slot of a communication frame into a plurality of intervals in accordance with the one or more scattering instructions, wherein each interval comprises a shorter duration than the time slot;

causing the at least one computer to distribute the plurality of intervals among one or more disparate time slots in the communication frame based at least in part on the one or more scattering instructions, wherein the plurality of intervals are distributed non-contiguously;

causing the at least one computer to transmit the plurality of intervals in accordance with locations of the plurality of intervals within the communication frames, wherein the one or more scattering specify an algorithm for temporally scattering the data.

29. The terminal device of claim 26, further comprising a memory for storing time-scattering control information, wherein the one or more scattering instructions comprise an index into the memory.

30. The non-transitory machine-readable storage medium of claim 28, further comprising code for causing the at least one computer to receive configuration information, wherein the configuration information includes the one or more scattering instructions.

31. The non-transitory machine-readable storage medium of claim 28, wherein the one or more scattering instructions include an index to a memory that stores time scattering control information.

32. The non-transitory machine-readable storage medium of claim 28, wherein the one or more scattering instructions include a table of information that indicates a temporal scattering of the data.

* * * * *